(12) United States Patent
Cheng et al.

(10) Patent No.: US 11,555,778 B2
(45) Date of Patent: Jan. 17, 2023

(54) HIGH-FLUX SENSOR SUITABLE FOR CORROSION BIG DATA MONITORING AND MANUFACTURING METHOD

(71) Applicant: University of Science and Technology Beijing, Beijing (CN)

(72) Inventors: Xuequn Cheng, Beijing (CN); Xiaogang Li, Beijing (CN); Chaofang Dong, Beijing (CN); Dawei Zhang, Beijing (CN); Hong Luo, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 16/649,279

(22) PCT Filed: Jun. 25, 2019

(86) PCT No.: PCT/CN2019/092786
§ 371 (c)(1),
(2) Date: Mar. 20, 2020

(87) PCT Pub. No.: WO2020/220450
PCT Pub. Date: Nov. 5, 2020

(65) Prior Publication Data
US 2022/0065771 A1    Mar. 3, 2022

(30) Foreign Application Priority Data
Apr. 29, 2019  (CN) .......................... 201910352916.6

(51) Int. Cl.
*G01N 17/00*    (2006.01)
*G01N 17/04*    (2006.01)

(52) U.S. Cl.
CPC ........... *G01N 17/006* (2013.01); *G01N 17/04* (2013.01)

(58) Field of Classification Search
CPC ................. G01N 17/04; G01N 17/006; G01N 17/0043
See application file for complete search history.

(56) References Cited

U.S. PATENT DOCUMENTS 3,936,737 A * 2/1976 Jefferies, Sr. .......... G01N 17/00
                                                324/700

FOREIGN PATENT DOCUMENTS

| CN | 203025146   |   | 6/2013  |
|----|-------------|---|---------|
| CN | 203025146 U | * | 6/2013  |
| CN | 103808648   |   | 5/2014  |
| CN | 103808648 A | * | 5/2014  |
| CN | 207163882   |   | 3/2018  |
| CN | 109001104   |   | 12/2018 |
| CN | 208459241   |   | 2/2019  |
| CN | 109612918   |   | 4/2019  |
| JP | 2016038339  |   | 3/2016  |

OTHER PUBLICATIONS

CN Office Action in Chinese Application 201910352916.6, dated Mar. 3, 2020, 7 pages (English translation).

* cited by examiner

*Primary Examiner* — Noam Reisner
(74) *Attorney, Agent, or Firm* — Fish & Richardson P.C.

(57) ABSTRACT

The present disclosure provides a high-flux sensor suitable for corrosion big data monitoring and a method of manufacturing the same. The sensor includes a first metal sheet, a second metal sheet and an insulating sheet therebetween. The two metal sheets are laminated. The metal sheets and the insulating sheet form a test piece group. A through hole is drilled in the test piece group.

8 Claims, 2 Drawing Sheets

HIGH-FLUX SENSOR SUITABLE FOR CORROSION BIG DATA MONITORING AND MANUFACTURING METHOD

CROSS-REFERENCE TO RELATED APPLICATIONS

This application is a U.S. National Phase application under 35 U.S.C. § 371 of International Patent Application No. PCT/CN2019/092786, filed on Jun. 25, 2019, which claims the benefit of Chinese Patent Application No. 201910352916.6, titled by "High-Flux Sensor Suitable For Corrosion Big Data Monitoring And Manufacturing Method", filed with the State Intellectual Property Office of China on Apr. 29, 2019, the whole disclosure of which is incorporated herein by reference.

FIELD

The present disclosure relates to technical field of corrosion big data monitoring, and in particular, to a high-flux sensor suitable for corrosion big data monitoring and a method of manufacturing the same.

BACKGROUND

Assessing corrosivity of environment is of great significance to corrosion research and protection of materials. At present, atmospheric corrosion evaluation method is to obtain a corrosion rate of typical metals such as carbon steel through a long-term field sheet corrosion test, and to evaluate an environmental corrosivity based on the corrosion rate. This evaluation method can only obtain average corrosion rate of the environment over a period of time, and cannot continuously monitor change of the environmental corrosivity in real time.

Another common method for monitoring atmospheric corrosion is to use an atmospheric corrosion sensor for monitoring. However, the sensor is difficulty to manufacture and thus a large error is caused when manufacturing it. In addition, as it is difficult to ensure a consistency of the sensors, accuracy and reliability of the data obtained by the sensors cannot be guaranteed in the actual environment. Traditional sensors have a service life that is not more than 2 years, and are not adapted to many situations (such as bridges, deserts, oceans, islands, reefs, etc.) where installation is inconvenient or excellent durability and stability are required.

SUMMARY

The disclosure provides a high-flux sensor suitable for corrosion big data monitoring and a method manufacturing the same. The sensor is simple to manufacture, has high stability, good consistency, and a long service life.

An aspect of the present disclosure provides a sensor including:
a first metal sheet, and a second metal sheet, the first metal sheet and the second metal sheet being stacked;
an insulating layer provided between the first metal sheet and the second metal sheet, such that a test piece group is formed by the first metal sheet, the second metal sheet, and the insulating layer; and
a working hole formed in the test piece group.

In one embodiment, the first metal sheet and the second metal sheet are standard electrodes, and a difference between electrode potentials between the first metal sheet and the second metal sheet is not less than 50 mV, and preferably the difference between the standard electrode potentials is more than or equal to 100 mV.

In one embodiment, the first metal sheet includes, but is not limited to, Zn, Al, Mg, carbon steel, or the like; the second metal sheet includes, but is not limited to, Cu, Ni, Ti, stainless steel, or the like.

In one embodiment, a thickness of the insulating sheet is in a range of 0.1 mm-2 mm.

The test piece group may also be fixed by rivets.

A working hole is a through hole. There is no requirement for a diameter and the number of the through holes. Generally, the diameter of the working hole is not less than 1mm in an area under strong corrosive atmosphere.

In one embodiment, a low-resistivity wire is a copper wire or a silver wire. An aspect of the present disclosure provides a high-flux sensor suitable for corrosion big data monitoring, including a plurality of sets of high-flux sensors according to claim 1, wherein the first metal sheets and the second metal sheets are alternately stacked, and an insulating layer is provided between each group of the first metal sheet and the second metal sheet. A test piece group is formed by laminating them.

An aspect of the present disclosure provides a method for manufacturing the high-flux sensor, including:
stacking the first metal sheet and the second metal sheet;
placing the insulating layer between the first metal sheet and the second metal sheet to form a laminating formation, or alternately stacking multiple groups of the first metal sheets and the second metal sheets, and proving the insulating layer is between each group of the first metal sheet and the second metal sheet to form a test piece group;
drilling a through hole in the test piece group;
electrically connecting all the first metal sheets in the test piece group in parallel to a low-resistivity wire, and electrically connecting all the second metal pieces in the test piece group in parallel to another low-resistivity wire.

The test piece group can be used with a cross section and upper and lower surfaces of the test piece group naked, but for further purposes, generally the cross section and the upper and lower surfaces of the test piece group are completely sealed with a resin or glue that can be cured. The sensor of the present disclosure is obtained after the resin or glue is completely cured.

In them: 1-low-resistivity wire; 2-first metal sheet A; 3-insulating sheet C; 4-second metal sheet B; 5-screw; 6-working hole.

DETAILED DESCRIPTION

In order to illustrate the technical problems, technical solutions, and advantages of the present disclosure clearer, a detailed description will be made as below with reference to the accompanying drawings and specific embodiments.

The present disclosure provides a high-flux sensor suitable for corrosion big is data monitoring and a method of manufacturing the same.

Figure 1:
FIG. 1 is a front view of a high-flux sensor suitable for corrosion big data monitoring of the present disclosure.
Figure 2:
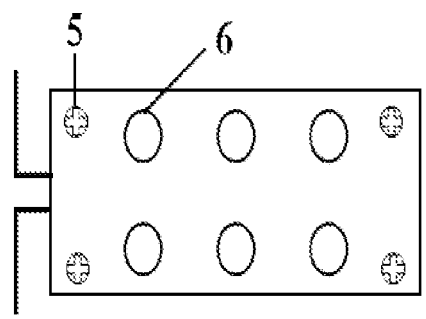
FIG. 2 is a top view of the high-flux sensor suitable for corrosion big data monitoring of the present disclosure.

In one embodiment, as shown in FIGS. 1 and 2, a high-flux sensor may include a first metal sheet 2, and a second metal sheet 4, which are laminated; an insulating layer 3, provided between the first metal sheet 2 and the second metal sheet 4 such that the first metal sheet 2, the second metal sheet 4, and the insulating layer 3 form a test piece group; and a working hole 6 formed in the test piece group. The insulating layer 3 may be a solid insulating layer, and may be formed by curing an organic material. For example, an adhesive organic insulating material is provided to adhere the first metal sheet 2 and the second metal sheet 4, and then the organic insulating material is cured to form the insulating layer 3. In one embodiment, the insulating layer is an insulating sheet disposed directly between the first metal sheet 2 and the second metal sheet 4. A cross section and upper and lower surfaces of the test piece group are all sealed with resin or glue, except that the working hole and a sidewall in the working hole are exposed, that is, the sidewalls of the holes in the first metal piece 2 and the second metal piece 4 respectively in the working hole are exposed so as to contact an ambient gas or fluid.

In this embodiment, evaluation of environmental corrosivity is achieved by only the first metal sheet and the second metal sheet, which renders a simple manufacturing process. Further, high measurement accuracy can be achieved without influence of the manufacturing process at all.

In one embodiment, the first metal sheet 2 and the second metal sheet 4 are electrodes, and a difference between electrode potentials of the first metal sheet 2 and the second metal sheet 4 is not less than 50 mV. For example, the first metal sheet 2 and the second metal sheet 4 are standard electrodes, thereby reducing cost of the sensor. In one embodiment, the difference between standard electrode potentials of the first metal sheet 2 and the second metal sheet 4 is greater than or equal to 100 mV. The first metal sheet 2 includes, but is not limited to, Zn, Al, Mg, and carbon steel; the second metal sheet 4 includes, but is not limited to, Cu, Ni, Ti, is and stainless steel. A thickness of each of the first metal sheet 2 and the second metal sheet 4 may be in a range of 1-10 mm.

In one embodiment, a thickness of the insulating sheet 3 (C) is in a range of 0.1 mm~2 mm. A material of the insulating sheet C may be PVC or other polymers, and the thickness of the insulating sheet C is 0.1 mm-2 mm. Thickness less than 0.1 mm may increase the difficulty of processing and increase the risk of short circuit between the first metal sheet A and (the second metal sheet) B. There is no special requirement for an area of the insulating sheet. Considering practicality and ease of installation, generally the insulating sheet has the same size as the metal sheet.

There is no special requirement for a shape and the area of the metal sheet. Considering the convenience of installation of the sensor, the whole area generally does not exceed 100 square centimeters; the thickness of each of the first metal sheet A and the second metal sheet B is 1-10 mm, as a thickness less than 1 mm would increase the difficulty of the processing, and deviation of the processing in turn would increase deviation of test result; and a thickness more than 10 mm would increase a weight of the sensor which has little improvement on the test accuracy. The areas of the first metal sheet A and the second metal sheet B may be the same, or they may be different by considering the convenience of installation.

In one embodiment, the sensor includes a test piece group composed of a first metal sheet 2, a second metal sheet 4, and an insulating sheet 3, which are fixed by rivets or screws 5. The rivets or screws 5 may be a universal element.

In this embodiment, the first metal sheet 2 and the second metal sheet 4 are staggered from each other, an aperture is provided by punching in an area of the first metal sheet 2 where the second metal sheet 4 is not laminated, and a screw 5 passes through the aperture to fix the first metal sheet 2 and the insulating sheet 3; another aperture is provided by punching in an area of the second metal sheet 4 where the first metal sheet 2 is not laminated, and another screw 5 passes through the another aperture to fix the second metal sheet 4 and the insulating sheet 3. With is such a configuration, a risk of electrical connection between the first metal sheet 2 and the second metal sheet 4 by the screws during the fixation of the screws, which results in a short circuit, can be avoided.

In another embodiment, the first metal sheet 2, the second metal sheet 4 and the insulating sheet 3 of the test piece group are fixed by an adhesive.

In one embodiment, the cross section and the upper and lower surfaces of the first metal sheet 2, the second metal sheet 4 and the insulating sheet 3 of the test piece group are all sealed by a curable resin or glue, except for the working hole. With such a configuration, stability and test accuracy of the sensor are beneficially improved.

In one embodiment, the high-flux sensor may further include a low-resistivity wire 1, such as a copper wire or a silver wire. It should be understood, however, that the wire 1 may not be considered as a component of the sensor. The first metal sheet 2 and the second metal sheet 4 are respectively connected to two low-resistivity wires 1.

In one embodiment, the high-flux sensor may further include a working hole 6. In this embodiment, the first metal sheet 2 and the second metal sheet 4 are laminated, and the insulating sheet 3 is arranged between the two. The first metal sheet 2, the second metal sheet 4 and the insulating sheet 3 form the test piece group. The working hole 6 is obtained by drilling in the test piece group, such that the working hole 6 penetrates the first metal sheet 2, the second metal sheet 4, and the insulating sheet 3. According to an embodiment of the present disclosure, a diameter of the working hole 6 is not less than 1 mm Sides of the working hole 6 are the surfaces of the first metal sheet 2 and the second metal sheet 4, which are exposed to the air or liquid environment, so that the corrosivity of the air or the liquid environment can be measured or evaluated.

In one embodiment, a high-flux sensor suitable for corrosion big data monitoring includes a plurality of test piece groups, each of which includes a first metal sheet 2 (A), an insulating sheet 3 (C), and a second metal sheet 4 (B) forming a laminated structure of ACB. The first metal sheets 2 (A) and the second metal sheets 4 (B) are alternately laminated, and the insulating layer 3 (C) is provided between each group of the first metal sheet 2 (A) and the second metal sheet 4 (B), thereby forming a test piece group by laminating. In this embodiment, the plurality of groups of sensors may include, for example, the structure of ACBCA, the structure of ACBCACB, and the structure of ACB-CACBCA.

In one embodiment, a Zn circle sheet with a thickness of 4 mm and a diameter of 38 mm is provided, and polymethyl methacrylate double-sided adhesive tapes with a thickness of 0.2 mm and a same size as the Zn circle sheet are placed and compacted on the upper and lower surfaces of the Zn circle sheet respectively; then, Cu circle sheets with a thickness of 2 mm and a diameter of 50 mm and the Zn circle sheet with the polymethyl methacrylate double-sided adhesive tapes are laminated and compacted in manner of Cu-Zn-Cu; three threaded holes in size of 3 mm are drilled in the non-overlapping areas of the Cu and Zn sheets, and the three metal sheets are fixed with M3 insulated nylon screws; 5 through-holes with a diameter of 6 mm are drilled as a working surface in an overlapping area of the Cu and Zn sheets, and the working surface of the device is polished and deoiled; the Cu and Zn sheets are respectively connected to the wires, and then the remaining space between the Cu sheets is filled with epoxy resin. After the epoxy resin is completely cured, a sensor is obtained. After exposing the sensor to the atmosphere of Beijing with connecting to a high-precision current tester, a time-current curve is obtained as shown in FIG. 2. The continuous monitoring of change of corrosivity of the atmosphere is realized in real time based on the response of the current to the corrosivity of the environment.

In one embodiment, a Zn circle sheet with a thickness of 4 mm and a diameter of 38 mm is selected, and polymethyl methacrylate double-sided transparent adhesive tapes with a thickness of 0.2 mm and a same size as the Zn circle sheet are placed and compacted on the upper and lower surfaces of the Zn circle sheet; Cu circle sheets with a thickness of 2 mm and a diameter of 50 mm and the Zn circle is sheet with the polymethyl methacrylate double-sided transparent adhesive tapes are laminated and compacted in manner of Cu—Zn—Cu; three threaded holes in size of 3 mm are drilled in the non-overlapping areas of the Cu and Zn sheets, and the three metal sheets are fixed with M3 insulating nylon screws; 5 through-holes with a diameter of 6 mm are drilled as a working surface in an overlapping area of the Cu and Zn sheets, and the working surface of the device is polished and deoiled; the Cu and Zn sheets are connected to wires, respectively, and then the remaining space between the Cu sheets is filled with epoxy resin. After the epoxy resin is completely cured, a sensor is obtained. Four identical sensors are produced.

Figure 3:
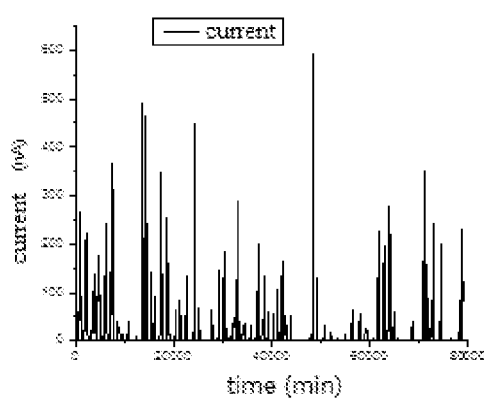
FIG. 3 is a curve of change of a current value over time characterizing environmental corrosivity according to an embodiment of the present disclosure.
Figure 4:
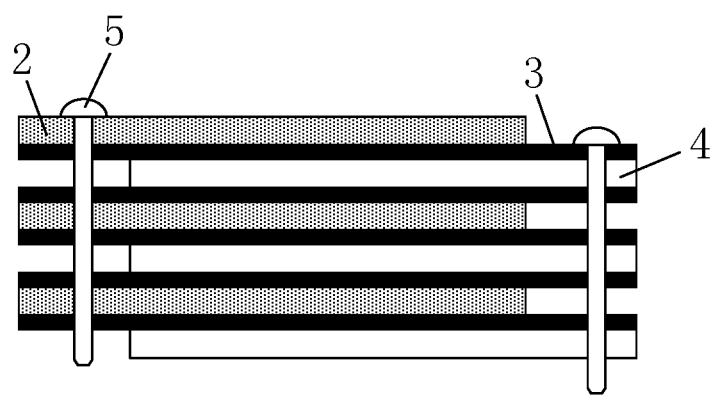
FIG. 4 is a cross-section view of a high-flux sensor device suitable for corrosion big data monitoring according to an embodiment of the present disclosure.

After the sensors are completed, the four sensors are subjected to an alternate immersion accelerated experiment (acceleration ratio 1:42) in a 3.5% NaCl solution that simulates atmospheric corrosion of the marine environment, and a high-precision current tester is provided to measure the current of the sensors. FIG. 3 is a curve of change of a current value over time characterizing environmental corrosivity according to an embodiment of the present disclosure. An average value of the currents of the sensors within half an hour during the experiment is calculated to check the consistency of the sensors (the current difference between the sensors within 3% is considered to be good). The test results are shown in Table 1. The results show that the current difference between the sensors is within 1%, and the consistency of the sensors is good. One of the sensors was randomly selected for a long alternate immersion experiment. A change rate of the sensor current changing over time to the initial current is calculated and a stability and service life of the sensors are checked (A sensor with a change of 15% of the sensor current relative to the initial current will be considered to be failed). The experimental results are shown in Table 2. The results show that the sensor has a service life of more than 5 years.

TABLE 1

| Average current value of the sensor | | | | |
|---|---|---|---|---|
| Sensor number | 1# | 2# | 3# | 4# |
| Average current value (nA) | 57842.6 | 57792.0 | 58004.9 | 57801.3 |

TABLE 2

| Change of the current of the sensor over time | | | | | |
|---|---|---|---|---|---|
| Test time (d) | 9 | 18 | 27 | 36 | 45 |
| Current change (%) | 5.1 | 4.9 | 7.1 | 10.6 | 14.5 |

The sensor is connected to a high-precision current tester, and the current value of the sensor is continuously monitored by the high-precision current tester. The change of the current value reflects the change of the environmental corrosivity, thereby achieving continuous monitoring of the environmental corrosivity. The material for manufacturing the sensor is easy available, and difficulty and complexity for the manufacturing are very low such that the manufacturing error is reduced and thus the consistency of the sensors can be guaranteed. A test accuracy of the sensor can be controlled by adjusting the thickness of the insulating sheet C, the diameter of the through hole, and the number of through holes, so as to be adapted to different requirements for environmental monitoring improving the applicability of the sensor as well as the stability and the service life of the sensor.

The above is embodiments of the present disclosure. It should be noted that for those of ordinary skill in the art, without departing from the principles described in the present disclosure, several improvements and retouches can be made, which are also considered as falling within the protective scope of this disclosure.

The invention claimed is:

1. A high-flux sensor device suitable for corrosion big data monitoring, comprising a plurality of sets of high-flux sensors, wherein each high-flux sensor comprises:
   a first metal sheet and a second metal sheet, which are laminated;
   an insulating layer disposed between the first metal sheet and the second metal sheet, the first metal sheet, the second metal sheet and the insulating layer forming a test piece group; and
   a working hole formed in the test piece group,
   wherein a cross section and upper and lower surfaces of the test piece group are all sealed with a resin or glue, except that the working hole and a sidewall in the working hole are exposed;
   the first metal sheet and the second metal sheet are staggered from each other, an aperture is provided by punching in an area of the first metal sheet where the second metal sheet is not laminated, and a screw passes through the aperture to fix the first metal sheet and the insulating sheet; and another aperture is provided by punching in an area of the second metal sheet where the first metal sheet is not laminated, and another screw passes through the another aperture to fix the second metal sheet and the insulating sheet;

the first metal sheets and the second metal sheets are alternately laminated, and the insulating layer is provided between each group of the first metal sheet and the second metal sheet, and the test piece group is formed by laminating; and the plurality of sets of high-flux sensors are stacked, and the high-flux sensor device further comprises another insulating layer disposed between two adjacent sets of high-flux sensors.

2. The high-flux sensor device according to claim 1, wherein the first metal sheet and the second metal sheet are electrodes, and a difference between electrode potentials of the first metal sheet and the second metal sheet is not less than 50 mV.

3. The high-flux sensor device according to claim 1, wherein the first metal sheet comprises Zn, Al, Mg, or carbon steel and the second metal sheet comprises Cu, Ni, Ti, or stainless steel.

4. The high-flux sensor device according to claim 1, wherein a thickness of each of the first metal sheet and the second metal sheet is in a range of 1-10 mm.

5. The high-flux sensor device according to claim 1, wherein a thickness of the insulating layer is in a range of 0.1 mm-2 mm.

6. The high-flux sensor device according to claim 1, wherein the first metal sheet, the second metal sheet, and the insulation layer of the test piece group are fixed by rivets or screws.

7. The high-flux sensor device according to claim 1, wherein the working hole is a through-hole penetrating the first metal sheet, the second metal sheet and the insulation layer with a diameter not less than 1 mm.

8. The high-flux sensor device according to claim 1, further comprising wires connected to the first metal sheet and the second metal sheet, respectively, the wires being copper wires or silver wires.

\* \* \* \* \*